United States Patent [19]

Duncan et al.

[11] Patent Number: 5,194,238
[45] Date of Patent: Mar. 16, 1993

[54] PROCESS FOR THE PRODUCTION OF HIGHLY PURE CONCENTRATED SLURRIES OF SODIUM HYPOCHLORITE

[75] Inventors: Budd L. Duncan, Athens; Richard C. Ness, Cleveland, both of Tenn.

[73] Assignee: Olin Corporation, Cheshire, Conn.

[21] Appl. No.: 865,725

[22] Filed: Apr. 8, 1992

Related U.S. Application Data

[63] Continuation of Ser. No. 675,373, Mar. 26, 1991, abandoned.

[51] Int. Cl.$^5$ .............................................. C01B 11/06
[52] U.S. Cl. .................................. 423/473; 252/187.25
[58] Field of Search .................... 423/473; 252/187.25

[56] References Cited

U.S. PATENT DOCUMENTS

| | | | |
|---|---|---|---|
| 3,498,924 | 3/1970 | Walsh et al. | 423/473 |
| 3,702,234 | 11/1972 | Pavia | 423/473 |
| 4,147,761 | 4/1979 | Wojtowicz et al. | 423/473 |
| 4,428,918 | 1/1984 | Verlaeten et al. | 423/473 |
| 4,780,303 | 10/1988 | Dugua | 423/473 |
| 5,055,285 | 10/1991 | Duncan et al. | 423/473 |
| 5,102,648 | 4/1992 | Duncan et al. | 423/473 |

FOREIGN PATENT DOCUMENTS

WO90/05111  5/1990  PCT Int'l Appl. .

*Primary Examiner*—John Niebling
*Assistant Examiner*—Brian M. Bolam
*Attorney, Agent, or Firm*—James B. Haglind; F. A. Iskander

[57] ABSTRACT

A process for producing sodium hypochlorite slurries admixes a hypochlorous acid solution having a concentration of 35 percent or greater by weight of HOCl with sodium hydroxide at a temperature below about 25° C. The reaction produces a slurry of sodium hypochlorite pentahydrate in an aqueous solution of sodium hypochlorite where the sodium hypochlorite is present in a concentration of at least 35 percent by weight of NaOCl. The sodium hypochlorite slurries have improved stability and greatly reduced amounts of sodium chloride. The process for produces high strength sodium hypochlorite compositions of high purity having improved yields and reduced product decomposition.

9 Claims, No Drawings

PROCESS FOR THE PRODUCTION OF HIGHLY PURE CONCENTRATED SLURRIES OF SODIUM HYPOCHLORITE

This application is a continuation of application Ser. No. 675,373, filed Mar. 26, 1991 now abandoned.

This invention is related to the production of pure concentrated slurries of sodium hypochlorite. More particularly, this invention is related to the production of pure concentrated slurries of sodium hypochlorite from pure concentrated solutions of hypochlorous acid.

Sodium hypochlorite solutions are widely used in bleaching and disinfectant formulations for home and industry. In addition to laundry applications in households and commercial laundries, sodium hypochlorite solutions are employed in hard surface, dairy, and bottle cleansers and sanitizers. These solutions can also be used in treating potable and waste water as well as treating wastes from metal processing operations such as plating.

The preparation of concentrated solutions of sodium hypochlorite has been carried out for many years by reacting a concentrated aqueous solution of sodium hydroxide with chlorine. The reaction may be represented by the following equations:

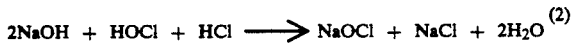

In addition to preparing sodium hypochlorite, the reaction mixture contains equal amounts of sodium chloride. A large number of processes have been developed to recover concentrated solutions of sodium hypochlorite by separating solid sodium chloride crystals from the reaction mixtures. A typical process is that of U.S. Pat. No. 4,780,303, issued Oct. 25, 1988 to J. Dugua. In this process, chlorine is reacted with a solution of sodium hydroxide in which the concentration is from 20 to 50% by weight of NaOH. The first stage of this process is carried out in an absorption column and the process produces a solution containing sodium hypochlorite in which the NaOCl is limited to 15% by weight and an excess of NaOH. In the second stage of the process, the sodium hypochlorite solution is fed to a crystallizer along with 48-50 weight percent NaOH and pure chlorine. The solution of sodium hypochlorite formed contains large crystals of NaCl which are separated to provide a sodium hypochlorite solution containing 25% by weight of NaOCl.

Upon cooling these solutions of sodium hypochlorite to about 10° C., crystals of sodium pentahydrate form and a slurry of sodium hypochlorite pentahydrate crystals in a solution of sodium hypochlorite results which contain about 23% by weight NaOCl and about 11% by weight of NaCl. These slurries containing sodium hypochlorite and salt, however have not been produced commercially.

To obtain more concentrated sodium hypochlorite compositions, R. H. Walsh in U.S. Pat. No. 3,498,924 prepared solid NaOCl compositions by reacting sodium hydroxide with hypochlorous acid. In this process, hypochlorous acid solutions, which are free of chloride ions, are reacted with concentrated sodium hydroxide at low temperatures such as 0° C. to produce a solution of sodium hypochlorite. The sodium hypochlorite solution is then vacuum-evaporated at temperatures below 45° C. and low pressures of about 1 mm Hg to prepare solid hydrated sodium hypochlorite. The solid hydrated sodium hypochlorite, for example, sodium hypochlorite dihydrate, is further dried to anhydrous sodium hypochlorite or mixed with solid sodium hydroxide to form a basic solid sodium hypochlorite.

The process of Walsh employs hypochlorous acid solutions having concentrations up to about 300 grams per liter of HOCl per liter, and commonly aqueous solutions containing 125 to 225 grams of hypochlorous acid per liter.

This process, however, initially produces sodium hypochlorite solutions containing about 20-27 percent by weight of NaOCl when using an aqueous solution of sodium hydroxide containing 50% by weight of NaOH. The process requires the separation of solid impurities and then the concentration of the solution by heating under vacuum to prepare the solid hydrated sodium hypochlorite.

It is known that the decomposition of sodium hypochlorite takes place in the solution phase. The process of Walsh et al produces solutions of sodium hypochlorite containing less than 30% by weight of NaOCl. The concentration step required to obtain solid sodium hypochlorite results in reduced yields because of the decomposition which occurs when the sodium hypochlorite solutions are heated.

Thus there is a need for sodium hypochlorite compositions having increased concentrations of NaOCl which can be readily produced, shipped and stored. Further, there is a need for high strength sodium hypochlorite compositions having a solid form of sodium hypochlorite which have improved stability. In addition, there is a need for high strength sodium hypochlorite compositions having greatly reduced amounts of sodium chloride. Still further, there is a need for a process for producing high strength sodium hypochlorite compositions having improved yields and reduced product decomposition.

Now it has been discovered that slurries of solid sodium hypochlorite in concentrated solutions of sodium hypochlorite can be produced directly without requiring further concentration. This results in increased yields and, further, the product contains reduced amounts of decomposition products. In addition, a separation step for solid by-products and impurities is not required.

These and other advantages are accomplished in a process for producing sodium hypochlorite slurries which comprises admixing at a temperature below about 25° C., a hypochlorite acid solution having a concentration of 35 percent or greater by weight of HOCl with sodium hydroxide to produce a slurry of sodium hypochlorite pentahydrate in an aqueous solution of sodium hypochlorite, the sodium hypochlorite being present in a concentration of at least 35 percent by weight of NaOCl and containing less than about 2 percent by weight of NaCl.

The novel process of the present invention employs as the starting material a concentrated solution of hypochlorous acid, HOCl. The method for producing high purity concentrated HOCl solutions is that in which gaseous mixtures, having high concentrations of hypochlorous acid vapors and chlorine monoxide gas and controlled amounts of water vapor are produced, for example, by the process described by J. P. Brennan et al in U.S. Pat. No. 4,147,761.

The gaseous mixture is then converted to a concentrated hypochlorous acid solution as described in WO 90/05111 published May 17, 1990 by J. K. Melton, et. al. Each of these publications is incorporated in its entirety by reference.

The concentrated hypochlorous acid solutions employed as one reactant have a concentration in the range of from about 35 to about 60, and preferably from about 40 to about 55 percent by weight of HOCl. The solution is substantially free of ionic impurities such as chloride ions and alkali metal ions and has low concentrations of dissolved chlorine. For example, concentrations of the chloride ion are less than about 50 parts per million and the alkali metal ion concentration is less than about 50 parts per million. The dissolved chlorine concentration in the hypochlorite acid solution is less than about 2 percent, and preferably less than about 1 percent by weight.

The second reactant in the novel process of the present invention is sodium hydroxide. The sodium hydroxide is employed as an aqueous solution or slurry containing from about 40 to about 80 percent by weight of NaOH, and preferably form about 40 to about 60 percent by weight of NaOH. The sodium hydroxide employed is, for example, an industrial grade having low concentrations of impurities such as sodium chloride.

This novel process of the present invention is operated continuously by admixing the hypochlorous acid solution, containing at least 35% by weight of HOCl, with the concentrated sodium hydroxide solution. The reaction mixture formed is a slurry of sodium pentahydrate crystals in a saturated solution of sodium hypochlorite. The reaction is carried out at temperatures below about 25° C., for example, in the range of from about 15° C. to about 23° C., and preferably, at from about 18° C. to about 23° C. In this single step process the slurries are recovered directly without further processing.

Slurries of sodium hypochlorite pentahydrate having increased concentrations of solids can be produced by reacting the concentrated solution of hypochlorous acid with the sodium hydroxide at temperatures in the range of from about 25° to about 35° C., and preferably at temperatures of from about 26° to about 30° C. A saturated solution of sodium hypochlorite is formed containing at least 35% by weight of NaOCl. This solution is then cooled to a temperature below about 25° C. to produce a slurry of sodium pentahydrate crystals in a saturated solution of sodium hypochlorite having high concentrations of solids.

It has been discovered that reaction of the hypochlorous acid solutions, having concentrations of above 35% by weight of HOCl, with the concentrated solution of sodium hydroxide can result in the occurence of supersaturation in the solutions of sodium hypochlorite. Thus, in the start-up of the process, it may be necessary to provide a crystallization site to prevent supersaturation from occurring. In one embodiment of the process, solid sodium hypochlorite particles are added to the initial reaction mixture to avoid or minimize the occurrence of supersaturation. The seeding or the initial crystallization in a supersaturated solution results in the formation of agglomerates of sodium pentahydrate crystals which do not flow. Operating the process of the invention continuously to maintain residual crystals in the reaction mixture results in the production of slurries of sodium hypochlorite pentahydrate in sodium hypochlorite solutions having a broad range of solids content which are readily flowable, i.e., can be pumped and handled in chemical processing equipment. Suitable total solids concentrations include, for example, slurries having total solids concentrations in the range of from about 5 to about 80, and preferably, from about 10 to about 60, and more preferably from about 30 to about 50 percent.

The novel process of the present invention is operated to a residual alkalinity to minimize decomposition of the saturated solution of sodium hypochlorite. Thus the slurries contain a residual of hydroxide ions of from about 0.2 to about 1.5%, and preferably from about 0.2 to about 0.5% percent by weight. Because of the very low concentrations of sodium chloride in the slurries and hence their relatively low ionic concentrations, the reaction can be controlled by the use of a pH probe which monitors the residual alkalinity of the reaction mixture.

To further illustrate the invention the following examples are provided without any intention of being limited thereby. All parts and percentages are by weight unless otherwise specified.

EXAMPLE 1

A 37% solution of sodium hypochlorite (approximately 300 mls) was prepared in a 0.5 liter jacketed stirred reactor batchwise by admixing a 45% solution of hypochlorous acid (HOCl) and a 50% solution of NaOH at a temperature of 19° C. A small portion (approximately 5 mls) of this material was removed and frozen using liquid nitrogen. When this frozen material was returned to the reactor, the contents of the vessel were converted from a solution to a slurry containing 45% solids. The temperature in the reactor rose to 23° C. Controlled flows of both the HOCl and NaOH solutions were then continuously added to the reactor, a 34% to 37% NaOCl slurry overflowed into a collection vessel.

EXAMPLE 2

In an agitated vessel equipped with an internal cooling coil, continuous flows of 45% hypochlorous acid (HOCl) and 50% caustic soda (NaOH) were admixed to produce a 35% NaOCl slurry containing between 30% and 50% of sodium hypochlorite pentahydrate solids. The flows were controlled to maintain the reaction mixture at temperatures between 21° C. and 23° C. and a residual NaOH concentration in the sodium hypochlorite slurry, determined by a pH probe, of between 0.2% and 1.5%.

What is claimed is:

1. A process for producing sodium hypochlorite pentahydrate which comprises admixing a hypochlorous acid solution having a concentration of 35 percent or greater by weight of HOCl with sodium hydroxide at a temperature from about 15° C. to about 23° C. to produce a slurry of sodium hypochlorite pentahydrate in an aqueous solution of sodium hypochlorite, the sodium hypochlorite being present in a concentration of at least 35 percent by weight of NaOCl.

2. The process of claim 1 in which the sodium hydroxide is an aqueous solution containing from about 40 to about 80 percent by weight of NaOH.

3. The process of claim 1 in which the total solids content is at least 5 percent by weight.

4. The process of claim 1 in which the slurry of sodium hypochlorite pentahydrate in the aqueous solution of sodium hypochlorite contains less than about 3 percent by weight of sodium chloride.

5. A process for producing sodium hypochlorite pentahydrate which comprises admixing a hypochlorous acid solution, having a concentration of 35 percent or greater by weight of HOCl, with sodium hydroxide at a temperature in the range of about 25° to about 35° C. to produce a saturated solution of sodium hypochlorite, and cooling the saturated solution of sodium hypochlorite to a temperature below about 25° C. to produce a slurry of sodium hypochlorite pentahydrate in an aqueous solution of sodium hypochlorite, the sodium hypochlorite being present in a concentration of at least 35 percent by weight of NaOCl.

6. The process of claim 5 in which the sodium hydroxide contains from about 40 to about 80 percent by weight of NaOH.

7. The process of claim 5 in which the total solids content is at from about 10 to about 60 percent by weight.

8. The process of claim 5 in which the hypochlorous acid solution has a concentration of from about 40 to about 60 percent by weight of HOCl.

9. The process of claim 5 in which the slurry of sodium pentahydrate in the aqueous solution of sodium hypochlorite contains less than about 3 percent by weight of sodium chloride.

* * * * *